(12) United States Patent
Sahai et al.

(10) Patent No.: US 11,338,161 B2
(45) Date of Patent: May 24, 2022

(54) FIRE SYSTEM RULE GENERATION

(71) Applicant: Honeywell International Inc., Morris Plains, NJ (US)

(72) Inventors: Deepika Sahai, New Delhi (IN); Narendra Chandrakant Salve, Bangalore (IN); Srivatsa Haridas, Bangalore (IN); Adithya Holehonnur, Bangalore (IN); Kamalraja Ganesan, Chennai (IN)

(73) Assignee: Honeywell International Inc., Charlotte, NC (US)

(*) Notice: Subject to any disclaimer, the term of this patent is extended or adjusted under 35 U.S.C. 154(b) by 63 days.

(21) Appl. No.: 16/431,052

(22) Filed: Jun. 4, 2019

(65) Prior Publication Data

US 2020/0384297 A1 Dec. 10, 2020

(51) Int. Cl.
*A62C 37/36* (2006.01)
*G05B 15/02* (2006.01)

(52) U.S. Cl.
CPC .............. *A62C 37/04* (2013.01); *G05B 15/02* (2013.01)

(58) Field of Classification Search
CPC .................................................. A62C 37/04
See application file for complete search history.

(56) References Cited

U.S. PATENT DOCUMENTS

| | | | |
|---|---|---|---|
| 8,923,993 B2 | 12/2014 | Kalathu et al. | |
| 2008/0209506 A1* | 8/2008 | Ghai | G06Q 10/06 726/1 |
| 2015/0033136 A1* | 1/2015 | Sasaki | G06F 3/0482 715/736 |
| 2015/0348399 A1* | 12/2015 | Cree | G06F 3/0488 340/514 |
| 2016/0300460 A1* | 10/2016 | Kulkarni | G06F 3/0412 |
| 2017/0176982 A1 | 6/2017 | Lutz et al. | |
| 2017/0278381 A1* | 9/2017 | Nalukurthy | G08B 29/145 |
| 2018/0039246 A1 | 2/2018 | Ferro et al. | |
| 2018/0061217 A1* | 3/2018 | Eichler | G08B 29/145 |

(Continued)

FOREIGN PATENT DOCUMENTS

| | | |
|---|---|---|
| EP | 3113136 | 1/2017 |
| EP | 2911024 B1 | 5/2017 |
| WO | 2018091108 | 5/2018 |

OTHER PUBLICATIONS

Siemens, "Virtual commissioning and operator training with SIMIT", https://new.siemens.com/global/en/products/automation/industry-software/simit.html, retrieved Jun. 4, 2019, 9 pages.

(Continued)

*Primary Examiner* — Nathan L Laughlin
(74) *Attorney, Agent, or Firm* — Brooks, Cameron & Huebsch, PLLC (57) ABSTRACT

Methods, devices, and systems for fire system rule generation are described herein. In some examples, one or more embodiments include a memory, and a processor to execute instructions stored in the memory to receive a rule input condition and a rule output condition for a fire control system of a facility, generate a fire system rule for the facility based on the rule input condition and the rule output condition, and transmit the fire system rule to a fire control panel of the fire control system of the facility.

16 Claims, 8 Drawing Sheets

(56) References Cited

U.S. PATENT DOCUMENTS

2018/0200552 A1\* 7/2018 Wertsberger ........... A62C 37/04
2018/0285084 A1 10/2018 Mimlitch et al.
2019/0370421 A1\* 12/2019 Nalukurthy ............. G08B 5/36
2020/0382480 A1\* 12/2020 Isaacson ................ G07F 9/001

OTHER PUBLICATIONS

Extended European Search Report for related European Application No. 20178128.3, dated Oct. 12, 2020 (8 pgs).

European Communication Pursuant to Article 94(3) EPC Exam Report for related European Application No. 20178128.3, dated Feb. 4, 2022 (9 pgs).

\* cited by examiner

FIRE SYSTEM RULE GENERATION

TECHNICAL FIELD

The present disclosure relates to methods, devices, and systems for fire system rule generation.

BACKGROUND

Facilities, such as commercial facilities, office buildings, hospitals, and the like, may have control systems that can be used during an emergency situation, such as, for instance, a fire, to manage the emergency situation in and/or around the facility. Such control systems may rely on fire safety devices such as smoke detectors, heat detectors, carbon monoxide (CO) detectors, among other types of fire safety devices, to detect an emergency event. Upon detection of an emergency event, other fire safety devices may activate, such as audible alarms, visual alarms, pre-programmed messages on a display, etc.

Fire safety devices in a facility may be programmed to activate according to fire system rules, which may include a predetermined order and/or predetermined time for activation. For example, in the case of an emergency event, audible alarms in first area of a facility may activate first, visual alarms in a second area of a facility may activate second after a pre-determined delay, etc. Ensuring the programming of these predetermined orders and times of these fire safety devices can allow for safe and efficient procedures during an emergency situation.

DETAILED DESCRIPTION

Methods, devices, and systems for fire system rule generation are described herein. In some examples, one or more embodiments include a computing device comprising a memory and a processor to execute instructions stored in the memory to receive a rule input condition and a rule output condition for a fire control system of a facility, generate a fire system rule for the facility based on the rule input condition and the rule output condition, and transmit the fire system rule to a fire control panel of the fire control system of the facility.

During commissioning of a fire control system for a facility, fire system rules can be created for the facility. As used herein, the term "fire system rules" refers to principles dictating actions of fire safety devices in a fire control system. For example, fire system rules can dictate actions of fire safety devices, such as when a fire hardware device is activated, in what order the fire hardware device is activated relative to other fire safety devices in the facility, etc.

In previous approaches, fire safety rules can be created by, for instance, a user such as a commissioning engineer. For example, a commissioning engineer can write fire system rules that dictate an output (e.g., such as how and when fire safety devices activate) based on an input (e.g., a fire alarm detects a fire in a particular area of a facility, etc.).

Such creation of the fire safety rules, however, can be a time intensive and laborious process. For example, in the case of a one floor facility, a commissioning engineer may have to create at least ten different fire safety rules. As the size of the facility increases (e.g., in zones, floors, etc.), the number of fire safety rules, as well as the complexity of those fire safety rules can increase.

Moreover, in order for the fire safety rules to be tested, a user may have to manually cause an input (e.g., manually cause a fire alarm to detect a fire in a particular area of the facility) to test the particular output (e.g., how and when certain fire safety devices activate). Therefore, testing of the fire safety rules can also be time intensive and laborious.

Fire system rule generation, in accordance with the present disclosure, can allow for generation of fire safety rules in a simple, efficient, and effortless manner. For example, fire safety rules can be generated via a textual rule prompt and/or a graphical rule prompt, allowing for a simple programming interface for a user such as a commissioning engineer. Fire system rule generation can indicate how many fire system rules are created, areas of the facility they apply to, and/or areas of the facility which do not yet include fire system rules, which can allow a user to easily determine fire system rule generation progress. Additionally, the user can easily test the fire safety rules and determine whether there are errors in the rule, whether a fire hardware device is faulty, where such errors or faulty fire safety devices may be located, etc. Accordingly, fire system rule generation in accordance with the present disclosure can allow for a user to more quickly generate and test fire system rules as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 1102 in FIG. 11.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
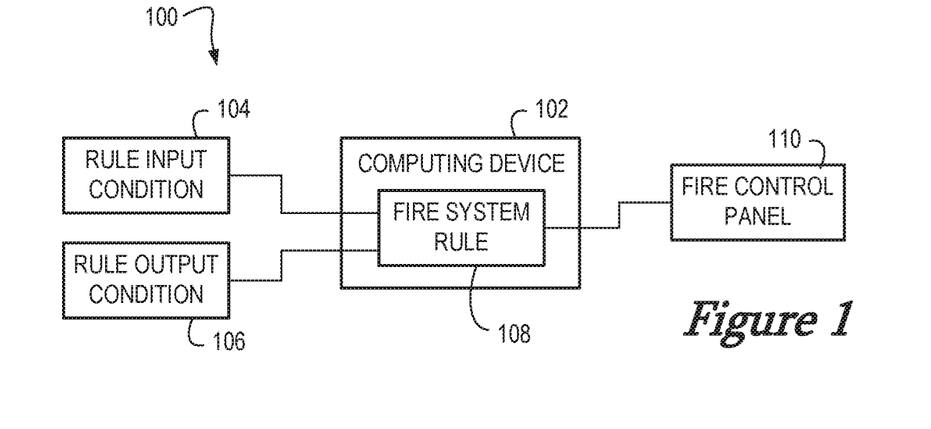
FIG. 1 is an example of a system for fire system rule generation, in accordance with one or more embodiments of the present disclosure.

FIG. 1 is an example of a system 100 for fire system rule generation, in accordance with one or more embodiments of the present disclosure. As illustrated in FIG. 1, the system 100 can include a computing device 102, a rule input condition 104, a rule output condition 106, and a fire control panel 110. The computing device 102 can generate a fire system rule 108. For instance, the computing device 102 can generate the fire system rule 108 utilizing a rule input condition 104 and a rule output condition 106.

As used herein, the term "rule input condition" refers to a particular cause that ultimately results in a behavior. For example, the rule input condition 104 can include a selection of a fire hardware device, a zone in a facility including a fire hardware device(s), a series of zones of the facility, a floor of the facility including a fire hardware device(s), a series of floors of the facility, a particular group of fire safety devices (e.g., on a zone, on a floor, spanning multiple zones, spanning multiple floors, and/or combinations thereof), among other examples of a rule input condition.

As used herein, the term "zone" refers to a particular area in the facility. For example, a zone can include an area on a floor of a facility, an area that spans floors of a facility, etc. As used herein, the term "floor" of a facility refers to a supporting surface extending horizontally throughout a facility. For example, a floor of a facility can be a horizontal area making up a particular level of the facility.

As used herein, the term "rule output condition" refers to a particular behavior that results in response to a particular cause. For example, the rule output condition 106 can include a selection of a particular alarm (e.g., audible, visible, textual, etc.), evacuation, faults, non-alarm, disable alarm, among other examples of a rule output condition.

The computing device can generate the fire system rule 108 based on the rule input condition 104 and the rule output condition 106. For example, the rule input condition 104 can be detection of event in Zone 003 of the facility, and the rule output condition 106 can be activation of alarm(s). Accordingly, the fire system rule 108 can be activation of alarms in Zone 003 of the facility in response to detection of an event in Zone 003 (e.g., an effect as a result of a cause), as is further described in connection with FIGS. 2-10.

The computing device can transmit the fire system rule 108 to the fire control panel 110. As used herein, the term "fire control panel" refers to a control panel installed in the facility that can be used by a user to directly control operation of components of the fire control system in the facility. For example, the fire control panel 110 can be connected to fire safety devices and/or sensors that can transmit a notification in response to a sensor sensing an emergency event occurring in the facility. As a result, the fire control panel 110 can control operations of components of the fire control system, such as generate alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other operations.

The computing device 102 can transmit the fire system rule 108 to the fire control panel 110 via a wired or wireless network. The wired or wireless connection can be a network relationship that connects the computing device 102 to the fire control panel 110. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Worldwide Interoperability for Microwave Access (WiMAX), infrared (IR) communication, Public Switched Telephone Network (PSTN), radio waves, and/or the Internet, among other types of network relationships.

As previously described above, the computing device 102 can generate the fire system rule 108. The computing device 102 can generate the fire system rule 108 utilizing a textual rule prompt as is further described herein with respect to FIGS. 2-5, and/or utilizing a graphical rule prompt as is further described herein with respect to FIGS. 6-8.

Figure 2:
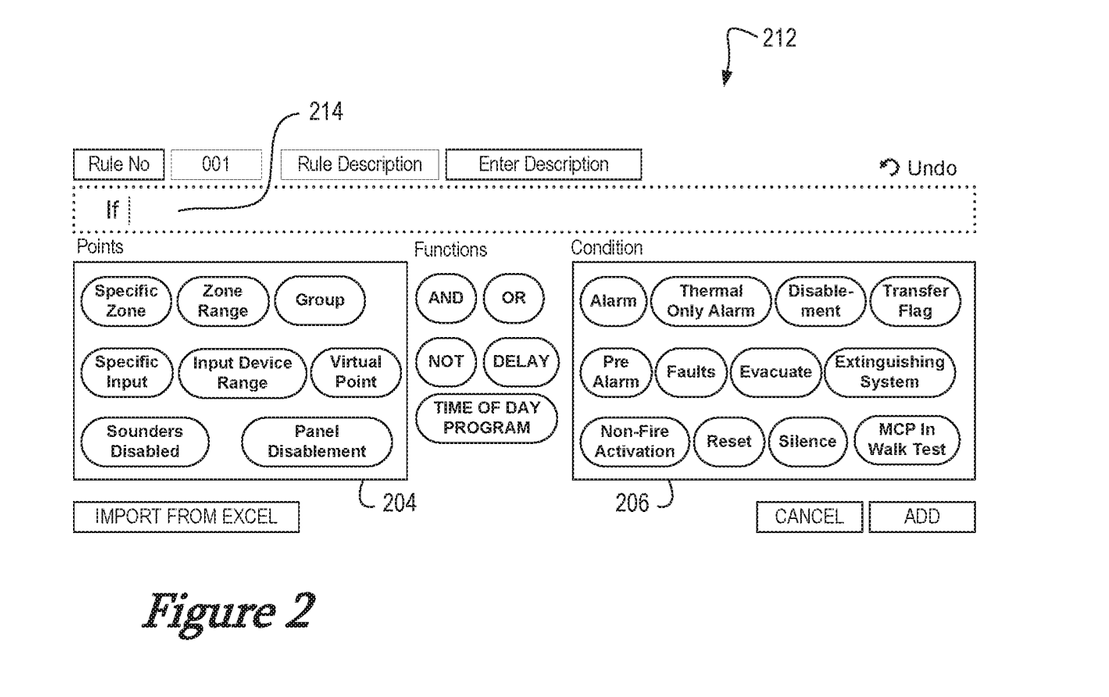
FIG. 2 is an illustration of a display provided on a user interface showing a textual rule prompt, in accordance with one or more embodiments of the present disclosure.

FIG. 2 is an illustration of a display 212 provided on a user interface showing a textual rule prompt 214, in accordance with one or more embodiments of the present disclosure. As illustrated in FIG. 2, the display 212 can include rule input conditions (e.g., points) 204, rule output conditions 206, and a textual rule prompt 214.

A computing device (e.g., computing device 102, 1102, described in connection with FIGS. 1 and 11, respectively), can generate the display 212. As used herein, the term "textual rule prompt" refers to an input area on a display to receive written user instructions. For example, the textual rule prompt 214 can receive textual user instructions from a user via an input device to the computing device, such as a keyboard, touch-screen display, spoken instructions (e.g., via a microphone), among other examples of input devices.

For example, a user can begin to program a fire system rule by starting to type a rule input condition 204 in the textual rule prompt 214. For example, a user may want a rule input condition 204 as a specific zone of the facility. Accordingly, the user can begin to type in the textual rule prompt 214 to input a rule input condition 204 into the fire system rule, as is further described with respect to FIGS. 3-5. The user can perform the same procedure to input a rule output condition 206, as is further described in connection with FIG. 5.

Figure 3:
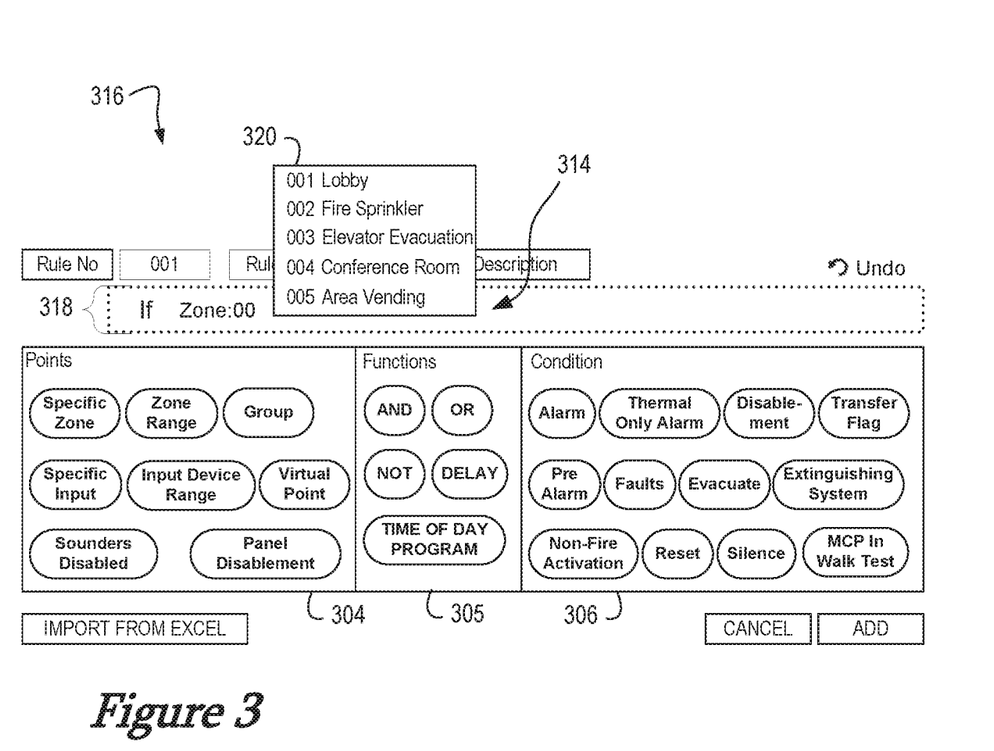
FIG. 3 is an illustration of a display provided on a user interface showing a textual rule prompt with a partial textual input, in accordance with one or more embodiments of the present disclosure.

FIG. 3 is an illustration of a display 316 provided on a user interface showing a textual rule prompt 314 with a partial textual input 318, in accordance with one or more embodiments of the present disclosure. As illustrated in FIG. 3, the display 316 can include rule input conditions 304, operator conditions (e.g., functions) 305, rule output conditions 306, a textual rule prompt 314, partial textual input 318, and number of pre-determined textual rule sub-objects 320.

As previously described in connection with FIG. 2, a user may begin to program a fire system rule. The user may want a rule input condition 304 as a specific zone in the facility. Accordingly, the user may begin to type, in the textual rule prompt 314, "@Zone: 00" (e.g., the partial textual input 318).

In response to the partial textual input 318 being entered into the textual rule prompt 314 (e.g., in response to the received portion of the textual input), the computing device can generate the number of pre-determined textual rule sub-objects 320. As used herein, the term "textual rule sub-objects" refers to objects included within a particular rule input condition. For example, as illustrated in FIG. 3, the pre-determined textual rule sub-objects 320 can be objects within the rule input condition 304 (e.g., a specific zone). For instance, as the user types the partial textual input 318 (e.g., "@Zone: 00") into the textual rule prompt 314, the computing device can generate a number of sub-objects (e.g., zones) within the "@Zone: 00" rule input condition. In the example illustrated in FIG. 3, the computing device generated five zones designated "001 Lobby; 002 Fire Sprinkler; 003 Elevator; 004 Conference Room; 005 Area Vending". In other words, as the user begins to type one of the rule input conditions 304 and/or one of the rule output conditions 306, the computing device can generate the number of pre-determined textual rule sub-objects 320 which are based on the received portion of the partial textual input 318.

In response to the generation of the number of pre-determined textual rule sub-objects 320, a user can select one of the pre-determined textual rule sub-objects 320. For example, the user can select (e.g., by clicking via a mouse, touching via a touch-screen display, or other input) Zone 003. If the particular zone the user wants is not included in the number of pre-determined textual rule sub-objects 320, the user can continue entering additional text in the textual rule prompt 314 until the zone is included in the generated number of pre-determined textual rule sub-objects 320.

Although the number of pre-determined textual rule sub-objects 320 is described above as being generated to include zones, embodiments of the present disclosure are not so limited. For example, a user may want a particular floor as the rule input condition 304 and begin to type "@Floor" into the textual rule prompt 314, after which a number of pre-determined textual rule sub-objects may be generated including floors of the facility. Additionally, the user may want any other rule input condition 304 and begin to type that rule input condition into the textual rule prompt 314 and the computing device can generate any other corresponding pre-determined textual rule sub-objects based on the partial textual input.

Textual rule sub-objects can be predefined and correspond to and/or be associated with various ones of the rule input conditions 304 and/or rule output conditions 306. The pre-determined textual rule sub-objects may be created and associated with various ones of the rule input conditions 304 and/or rule output conditions 306 and be stored in a database that is remote to the computing device or local to the computing device.

Although selection of a rule input condition 304 and/or a rule output condition 306 is described above as being selected from the number of pre-determined textual rule sub-objects 320 generated in response to the partial textual input 318, embodiments of the present disclosure are not so limited. For example, a user can select a rule input condition 304 and/or a rule output condition 306 by directly selecting one of the displayed rule input conditions 304 and/or rule output conditions 306, as is further described in connection with FIG. 4.

Continuing with the example from above, once the computing device has received a rule input condition 304 (e.g., Zone 003), the computing device can receive a selection of a fire hardware device included with the rule input condition 304. For example, within Zone 003, the user can select particular devices (e.g., all device types, only fire detectors (e.g., generally or of a certain type), only smoke detectors (e.g., generally or of a certain type), etc.) The user may select all device types, which can create a fire system rule that involves all device types within Zone 003, as is further described herein.

In some examples, the computing device can receive a selection of an operator condition. As used herein, the term "operator condition" refers to an input that causes a particular mathematical, relational, or logical operation to produce a result. For example, operator conditions 305 can include "AND", "OR", "NOT", "Delay", "Time of Day Program" operators, among other types of operators.

The operator conditions 305 can modify input conditions 304 and/or output conditions 306. For example, the computing device can receive operator condition 305 as "OR", and then receive an additional input condition 304 (e.g., a user can begin to type "Input Device Range" into the textual rule prompt 314 to allow a selection of device ranges (e.g., Panel 001 Ground Floor Parking Area on Loop 1 with a device range from Device 005 to Device 013). Accordingly, the fire system rule can now include "All device types within Zone 003 OR Device Range of Device 005 to 013 located on Loop 1 of Panel 001". The computing device can receive a selection of an action for the fire safety devices with the rule output condition 306, as is further described in connection with FIG. 5.

Figure 4:
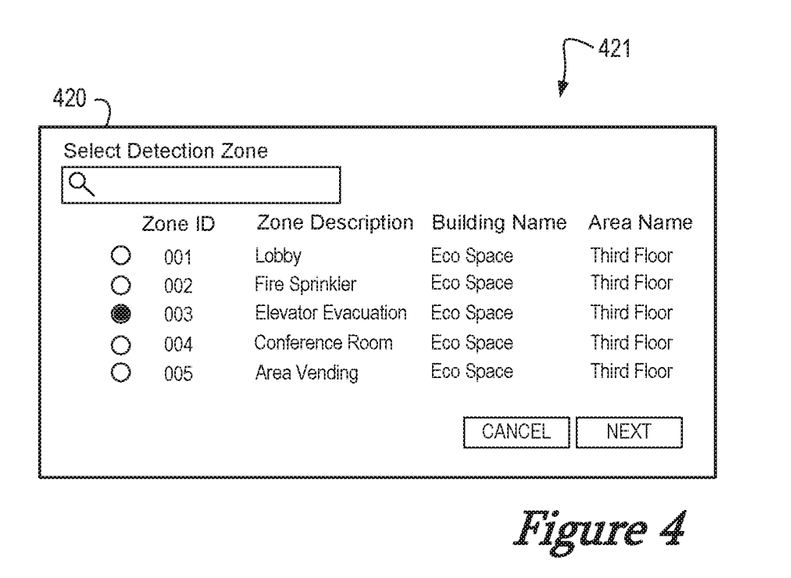
FIG. 4 is an illustration of a display provided on a user interface showing textual rule sub-objects, in accordance with one or more embodiments of the present disclosure.

FIG. 4 is an illustration of a display 421 provided on a user interface showing textual rule sub-objects 420, in accordance with one or more embodiments of the present disclosure. As illustrated in FIG. 4, the textual rule sub-objects 420 can be included in a pop-up window as a result of a selection of a rule input condition and/or a rule output condition.

As previously described in connection with FIG. 3, the computing device can receive a selection of a rule input condition (e.g., rule input condition 304, previously described in connection with FIG. 3) and/or a rule output condition (e.g., rule output condition 306, previously described in connection with FIG. 3) by directly selecting one of the displayed rule input conditions and/or rule output conditions. As a result of the selection, the computing device can generate the number of pre-determined textual sub-objects 420. For instance, as the user selected Zones in the rule input conditions, the computing device can generate the number of sub-objects (e.g., zones) within the selected "Zones" rule input condition. As illustrated in FIG. 4, the computing device generated five zones designated "001 Lobby; 002 Fire Sprinkler; 003 Elevator; 004 Conference Room; 005 Area Vending". In other words, as the user selects one of the rule input conditions and/or one of the rule output conditions, the computing device can generate the number of pre-determined textual rule sub-objects 420 which are based on the selected rule input condition and/or rule output condition.

In response to the generation of the number of pre-determined textual rule sub-objects 420, a user can select one of the pre-determined textual rule sub-objects 420. For example, the user can select (e.g., by clicking via a mouse, touching via a touch-screen display, or other input) Zone 003. If the particular zone the user wants is not included in the number of pre-determined textual rule sub-objects 420, the user can perform a more limiting search to find the zone.

Figure 5:
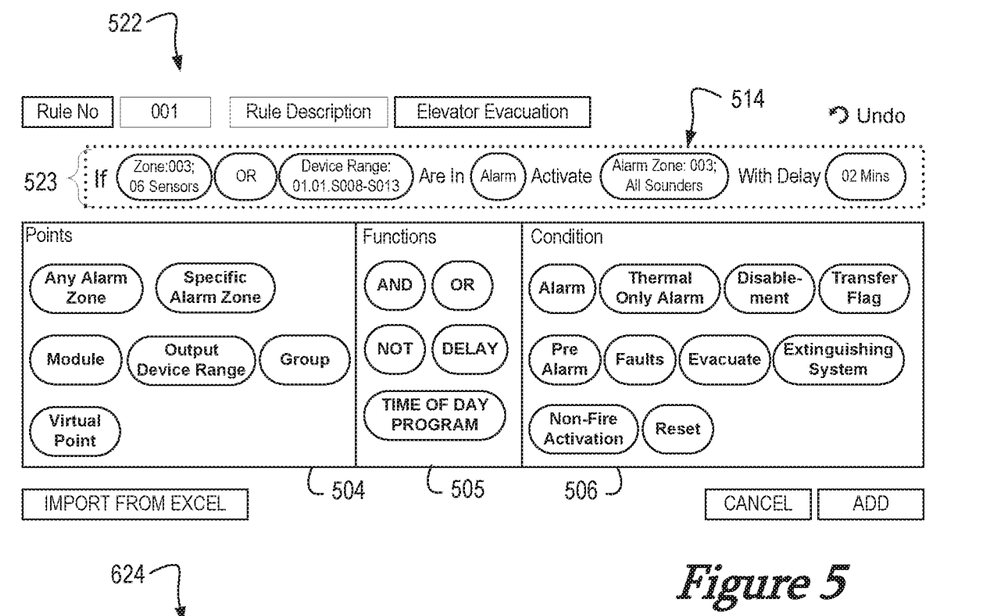
FIG. 5 is an illustration of a display provided on a user interface showing a textual rule prompt with a fire system rule having a rule input condition and a rule output condition, in accordance with one or more embodiments of the present disclosure.

FIG. 5 is an illustration of a display 522 provided on a user interface showing a textual rule prompt 514 with a fire system rule 523 having a rule input condition and a rule output condition, in accordance with one or more embodiments of the present disclosure. As illustrated in FIG. 5, the textual rule prompt 514 can include the completed fire system rule 523.

As previously described in connection with FIGS. 2-4, the computing device can receive a rule input condition 504 (e.g., by partial textual input or by selection of a displayed rule input condition 504) and a rule output condition 504 (e.g., by partial textual input or by selection of a displayed rule output condition 506). Additionally, the computing device can receive operator conditions 505. For example, as previously described in connection with FIG. 3, the computing device can receive rule input conditions 504 and operator conditions 505 such that the partial fire system rule is All device types within Zone 003 OR Device Range of Device 005 to 013 located on Loop 1 of Panel 100, illustrated in FIG. 5 as "If Zone: 003:06 Sensors OR Device Range: 01.01.S005-S013".

The user may want the fire system rule to include an alarm condition with sounders activating after a certain time delay in the specified zones. Accordingly, the user can select, and the computing device can receive, a rule output condition 506 as "Alarm". The user can begin to type "Alarm" in the textual rule prompt 514 or select Alarm in the displayed rule output conditions 506. The user can then narrow the Alarm condition by selecting another rule input condition from rule input conditions 504 such as "Any Alarm Zone", "Specific Alarm Zone", "Module", "Range of Outputs", "Group", "Virtual Point", among other rule input conditions 504. As described above, a user can select between rule input conditions 504 and rule output conditions 506 in various orders. In some examples, while a user is selecting a rule input condition 504, rule output conditions 506 can be disabled and while a user is selecting a rule output condition 506, rule input conditions 504 can be disabled. Disabling either the rule input conditions 504 or the rule output conditions 506 while the other is being selected can prevent an illogical fire system rule from being created.

As described above, the user may select the narrowing rule input condition 504 as a "Specific Alarm Zone", allowing the user to select a particular alarm zone in the facility (e.g., "AlarmZone 003"). Further, the user may select a particular type of alarm to be generated by the alarms located in Zone 003 (e.g., all device types, only sounders, only strobes, by device type, etc.). The user may select "Only Sounders".

Continuing with the example above, the user may select an additional operator condition 505. For example, in order to introduce the delay, the user may select "Delay" from the operator conditions 505, allowing the user to select a particular amount of delay (e.g., 2 minutes).

Accordingly, the fire system rule is illustrated in FIG. 5 as follows: "If Zone: 003:06 Sensors OR Device Range: 01.01.S005-S013 Are in Alarm, Activate AlarmZone: 003; All Sounders with Delay 02 Mins". In other words, the fire system rule can trigger an alarm by activating sounders in Zone 003 after a delay of 2 minutes when either of the devices in Zone 003 or detectors in the range S008-S013 in Loop 1) goes active.

Once a user is satisfied with the fire system rule 523, the user can click "Add" to generate the fire system rule for the facility based on the rule input conditions 504 and the rule output conditions 506, as well as the operator conditions 505. The fire system rule 523 can be transmitted to a fire control panel of the system, as previously described in connection with FIG. 1.

Generating fire system rules according to the disclosure can allow a user to easily create fire system rules. For example, the user can easily select or type particular conditions (e.g., rule inputs and/or rule outputs) using the textual rule prompt to generate fire system rules. Utilizing the textual rule prompt can allow for relatively simple creation of fire system rules that may be complex.

Figure 6:
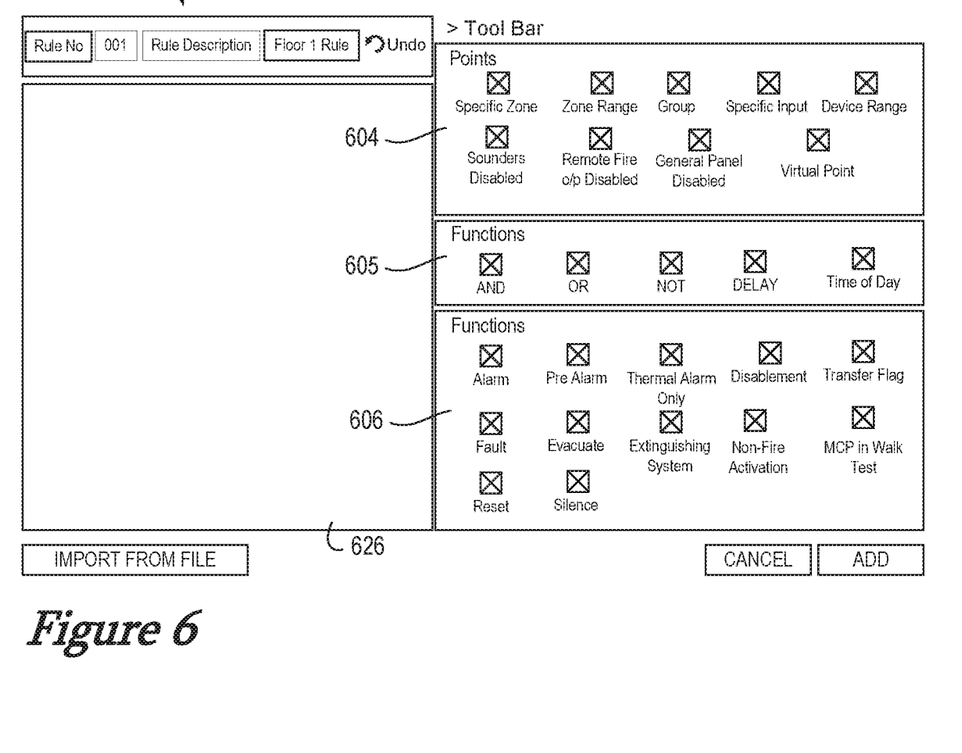
FIG. 6 is an illustration of a display provided on a user interface showing a graphical rule prompt, in accordance with one or more embodiments of the present disclosure.

FIG. 6 is an illustration of a display 624 provided on a user interface showing a graphical rule prompt 626, in accordance with one or more embodiments of the present disclosure. As illustrated in FIG. 6, the display 624 can include rule input conditions 604, rule output conditions 606, operator conditions 605, and graphical rule prompt 626.

A computing device (e.g., computing device 102, 1102, described in connection with FIGS. 1 and 11, respectively), can generate the display 624 including the graphical rule prompt 626. As used herein, the term "graphical rule prompt" refers to an input area on a display to receive graphical user instructions. For example, the graphical rule prompt 626 can receive graphical user instructions from a user via an input device to the computing device, such as a keyboard, touch-screen display, spoken instructions (e.g., via a microphone), among other examples of input devices.

For example, a user can begin to program a fire system rule by selecting a graphical rule input condition 604 in the graphical rule prompt 626. For instance, a user may want a rule input condition 604 as a specific zone of the facility. Accordingly, the user can input a rule input condition 604 by "dragging and dropping" a graphical rule object from the displayed rule input conditions 604 into the graphical rule prompt 626, as is further described with respect to FIGS. 7-8. The user can perform the same procedure to input a rule output condition 606, as is further described in connection with FIG. 8.

Figure 7:
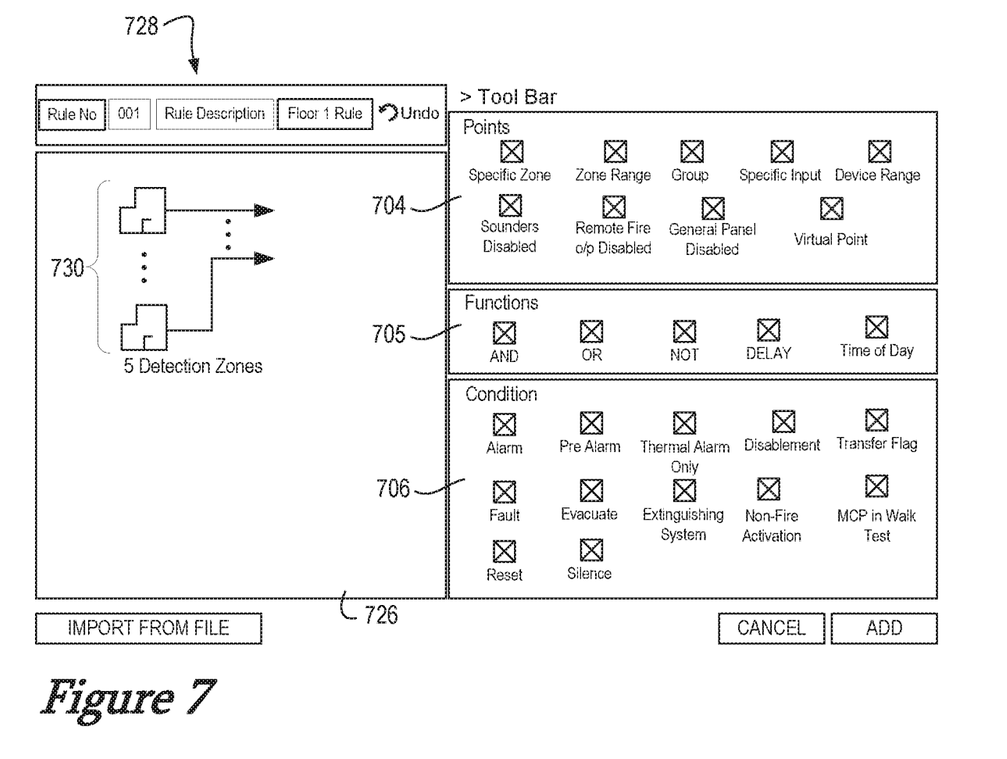
FIG. 7 is an illustration of a display provided on a user interface showing a graphical rule prompt having a selection of a graphical rule object, in accordance with one or more embodiments of the present disclosure.

FIG. 7 is an illustration of a display 728 provided on a user interface showing a graphical rule prompt 726 having a selection of a graphical rule object 730, in accordance with one or more embodiments of the present disclosure. As illustrated in FIG. 7, the display 728 can include rule input conditions 704, rule output conditions 706, a graphical rule prompt 726, and the graphical rule object 730.

As previously described in connection with FIG. 6, a user may want to begin to program a fire system rule. The user may want a rule input condition 704 as a specific zone in the facility. Accordingly, the user may first select "Zone" from the displayed rule input conditions 704.

In response to the selection of Zone, the computing device can generate a window (e.g., not illustrated in FIG. 7) such that a user can select a zone, a list of zones, etc. included in the facility. In response to the user selecting a list of zones, the computing device can generate the graphical rule object 730. The graphical rule object 730 can include graphical rule sub-objects (e.g., the list of selected zones). Although not illustrated in FIG. 7, the graphical rule object 730 can include particular fire safety devices within the selected zones, etc. For example, a user may select a particular fire hardware device included in one of the zones of the list of selected zones.

As illustrated in FIG. 7, the graphical rule object 730 can include all zones of the selected zones. However, embodiments of the disclosure are not so limited. For example, a user may select an operator condition 705 such that the fire system rule can be either of fire safety devices in a particular set of zones being activated, as is further described in connection with FIG. 8.

Figure 8:
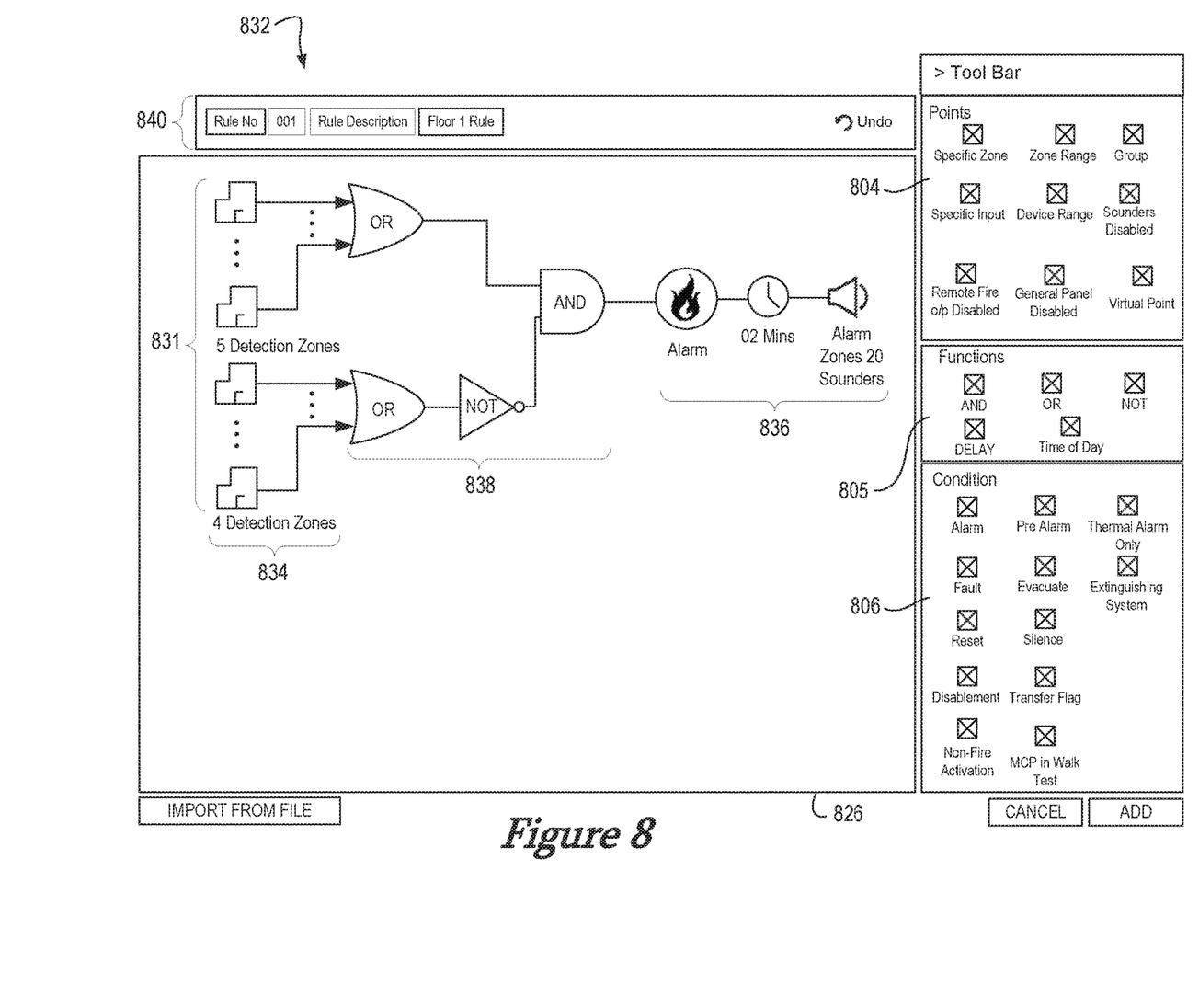
FIG. 8 is an illustration of a display provided on a user interface showing a graphical rule prompt with a fire system rule having a rule input condition and a rule output condition, in accordance with one or more embodiments of the present disclosure.

FIG. 8 is an illustration of a display 832 provided on a user interface showing a graphical rule prompt 826 with a fire system rule 831 having a rule input condition and a rule output condition, in accordance with one or more embodiments of the present disclosure. As illustrated in FIG. 8, the display 832 can include rule input conditions 804, operator conditions 805, rule output conditions 806, rule details 840, and fire system rule 831. Fire system rule 831 can include a first graphical rule object 834, a second graphical rule object 836, and operator graphical object 838.

As previously described in connection with FIG. 7, the computing device can receive a rule input condition 804 as a list of zones as a graphical rule object (e.g., graphical rule object 730, previously described in connection with FIG. 7). For example, the rule input condition can be via a selection of a graphical rule object to the graphical rule prompt. A user can further select an operator condition 805 such that the fire system rule can be a condition which any device included in either of the sets of zones is activated (e.g., by "dragging and dropping" an "OR" operator from the operator conditions 805 to the graphical rule prompt 826. In other words, a graphical rule object can be selected for the rule input condition). Similarly, a graphical rule object can be selected for the rule output condition, as is further described herein. The operator condition can modify a rule input condition and/or a rule output condition.

A user may want to add another range of devices in order to combine results with the existing fire system rule. Accordingly, a user can select an additional "Zone Range" rule input condition from the displayed rule input conditions 804 and select particular zones of interest. Further, the user can select an additional "OR" operator from the operator conditions 805 such that the fire system rule can be a condition which any device included in either of the particular zones of interest are activated.

The conditions can be "dragged" from the rule input conditions 804, operator conditions 805, and/or rule output conditions 806, and "dropped" proximate to another of the rule input conditions 804, operator conditions 805, and/or rule output conditions 806 included in the graphical rule prompt 826 in order to associate them to one another. As each new rule input condition 804, operator condition 805, and/or rule output condition 806 is added to the fire system rule, a visual preview can be generated in the graphical rule prompt 826.

The visual preview can display an association between the first graphical rule object 834 and the second graphical rule object 836. For example, the association can allow a user to view how the first graphical rule object 834 is associated with the second graphical rule object 836 via operator graphical object 838.

Although the first graphical rule object 834 is illustrated as being associated with the second graphical rule object 836 via the operator graphical object 838, embodiments of the present disclosure are not so limited. For example, the first graphical rule object 834 can be directly associated with the second graphical rule object 836 without an operator graphical object 838.

A user may want an inverse of a result as part of the fire system rule. Accordingly, the user may select the "NOT" graphical rule object from the displayed operator conditions 805. In such an instance, a response from a device and/or a group of devices included in the particular zones of interest can be ignored.

In order to create an association between the graphical rule object for the list of zones and the graphical rule object for the particular zones of interest, the user can select, and the computing device can receive, an "AND" graphical rule object from the displayed operator conditions 805. The user can then select an "Alarm" graphical rule object, a "Delay" graphical rule object, and an "Alarm Zone" graphical rule object from the displayed rule output conditions 806 and the computing device can update the preview of the fire system rule in graphical rule prompt 826.

Accordingly, the computing device can generate the fire system rule according to the selected graphical objects (e.g., the first graphical rule objects 834, the second graphical rule objects 836, and the operator graphical objects 838). The fire system rule can, accordingly, trigger an alarm by activating sounders in either of the list of zones but ignore activation of devices in the particular zones of interest, where the sounders are activated after a delay (e.g., 2 minutes) when any of the devices in selected list of zones go active.

Once a user is satisfied with the fire system rule 831, the user can click "Add" to generate the fire system rule for the facility based on the rule input conditions 804 and the rule output conditions 806, as well as the operator conditions 805. The fire system rule 831 can be transmitted to a fire control panel of the system, as previously described in connection with FIG. 1.

The display 832 can additionally display details 840 about (e.g., describing) the fire system rule 831. For example, as illustrated in FIG. 8, the details 840 can include the rule number (e.g., Rule 001) of the fire system rules and/or a rule description (e.g., Floor 1 rule).

Generating fire system rules according to the present disclosure can allow a user to easily create fire system rules. For example, the user can easily select particular conditions (e.g., rule inputs and/or rule outputs) using the graphical rule prompt to generate fire system rules. Utilizing the graphical rule prompt can allow for relatively simple creation of fire system rules that may be complex.

Figure 9:
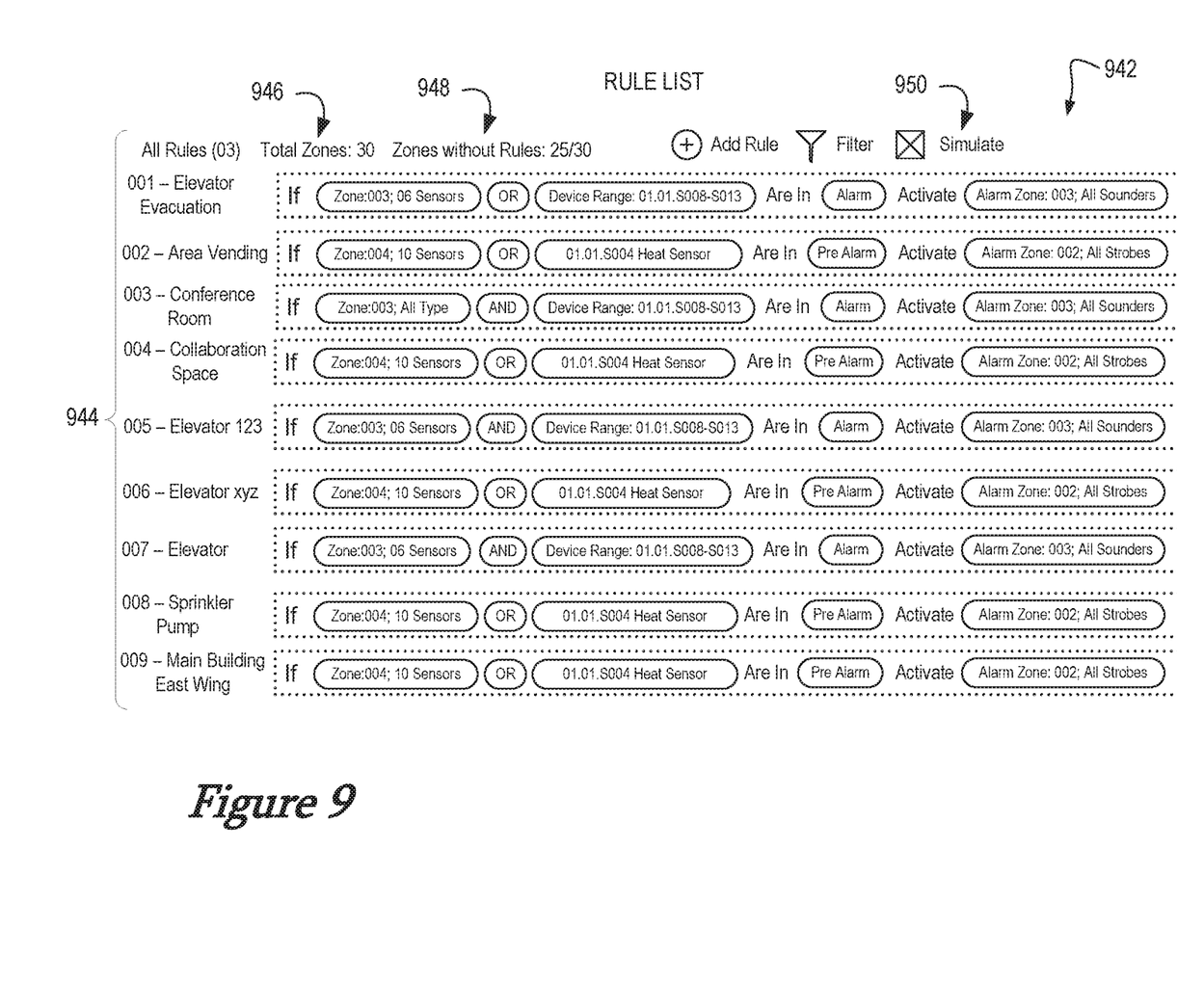
FIG. 9 is an illustration of a display provided on a user interface showing a created fire system rules list, in accordance with one or more embodiments of the present disclosure.

FIG. 9 is an illustration of a display 942 provided on a user interface showing a created fire system rules list 944, in accordance with one or more embodiments of the present disclosure. As illustrated in FIG. 9, the display 942 can include the created fire system rules list 944, a total number of zones 946 in the facility, a total number of zones having fire system rules 948, and a fire system rules test (e.g., simulation) 950.

A computing device (e.g., computing device 102, 1102, described in connection with FIGS. 1 and 11, respectively), can generate the display 942. Once the computing device has generated a fire system rule, it can be added to the created fire system rules list 944. The created fire system rules list 944 can include information about the fire system rule, the zone it is created for, among other information.

As many jurisdictions may specify that fire system rules are to be in place for all zones of a facility, it can be helpful to the user to know how many zones are included in the facility, which of the zones do not yet have fire system rules associated therewith, etc. The display 942 can include a list of the total number of zones in the facility 946 (e.g., 30 total zones) as well as an indicator of the number of zones not having fire system rules 948 (e.g., 25/30). For example, as the fire system rules list 944 is populated with generated fire system rules, the number of zones not having fire system rules 948 can be updated (e.g., as the 25th fire system rule is added to the created fire system rules list 944, the total number of zones not having fire system rules 948 can be updated (e.g., from 25/30 to 24/30).

As illustrated in FIG. 9, the total number of zones not having fire system rules 948 can be 23 out of 30. Accordingly, a user may want to know which of the 23 zones do not yet have fire system rules. Therefore, a user can select (e.g., click on) the total number of zones not having fire system rules 948 indicator. In response, the computing device can generate and display (e.g., not illustrated in FIG. 9) which zones of the total number of zones 946 (e.g., which 5 zones) do not yet include a fire system rule. Accordingly, a user can note the zones which they still have yet to create a fire system rule for.

The computing device can test a fire system rule(s) included in the created fire system rules list 944. For example, the computing device can cause the fire control panel of the fire control system to execute the fire system rule in the facility. For instance, the computing device can cause the fire control panel to activate sounds in a zone (e.g., Zone 003) after a delay (e.g., of two minutes) in response to a device in a zone (e.g., Zone 003) is activated (e.g., by the fire control panel). Further, testing of the fire system rules can allow a user to determine any zones which do not include fire system rules. For example, testing of the fire system rules can notify a user that particular zones do not include yet include fire system rules, as is further described in connection with FIG. 10.

Fire system rule generation, in accordance with the present disclosure, can allow for simple, efficient, and effortless generation of fire safety rules. Additionally, the fire system rules can be easy tested without having to manually activate various devices, which can allow for quick generation and testing of fire safety rules, even in complex facilities.

Figure 10:
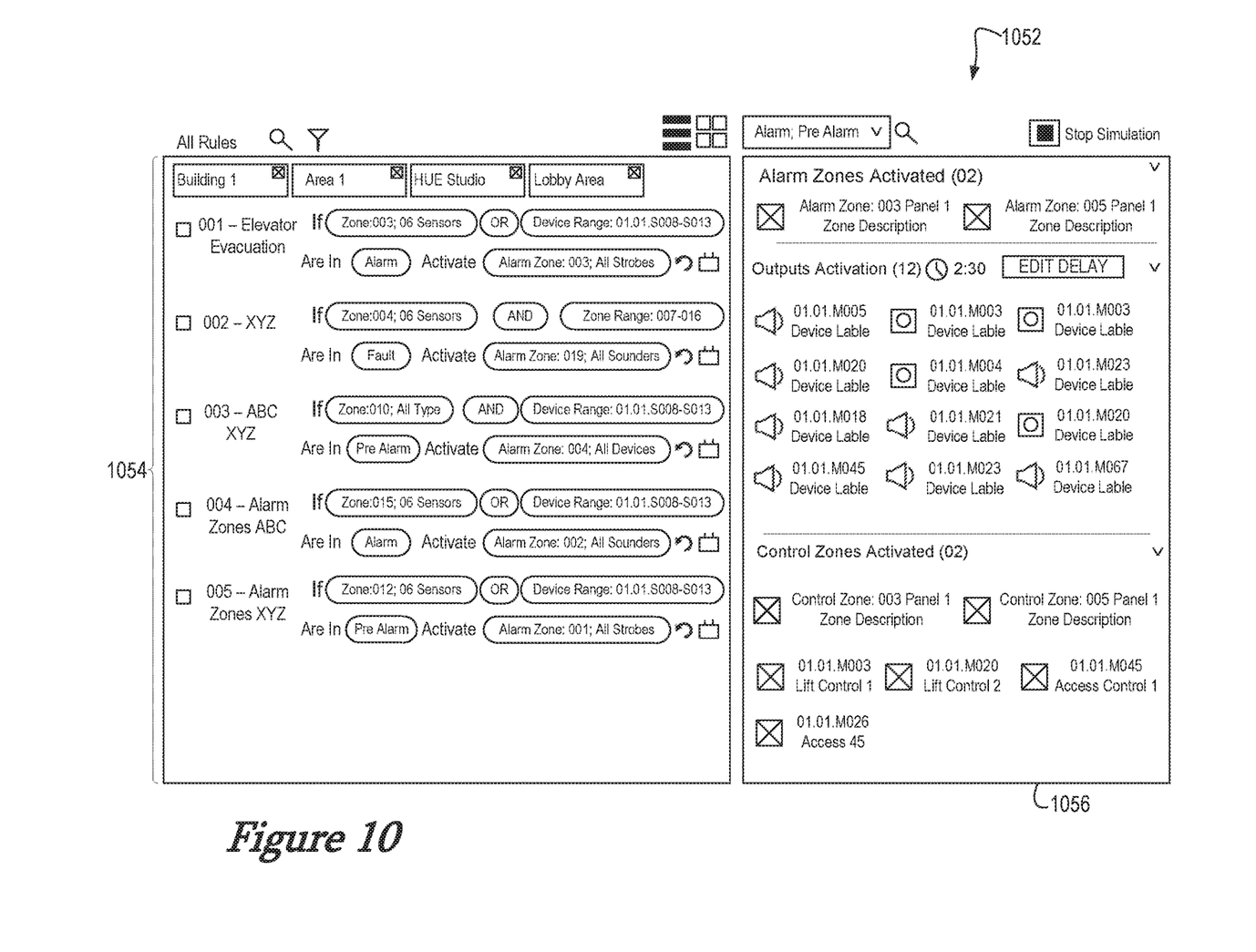
FIG. 10 is an illustration of a display provided on a user interface showing a report generated by testing the created fire system rules, in accordance with one or more embodiments of the present disclosure.

FIG. 10 is an illustration of a display 1052 provided on a user interface showing a report 1056 generated by testing the created fire system rules, in accordance with one or more embodiments of the present disclosure. As illustrated in FIG. 10, the display 1052 can include the list of tested fire system rules 1054 and the report 1056.

As previously described in connection with FIG. 9, the computing device can test fire system rules in a facility. Testing fire system rules in the facility can allow for a user to determine whether there are errors in any of the fire system rules, whether there are zones that do not yet include fire system rules, etc. For example, in response to testing the created fire system rules, the computing device can generate a notification to the user that a particular rule includes an error (e.g., an illogical operator, a missing connection, etc.). In some examples, in response to testing the created fire system rules, the computing device can generate a notification that a particular zone does not include a fire system rule. For example, the user may have forgotten to create a fire system rule for a zone and in response to the user testing the fire system rules, the computing device can generate a notification to the user that a particular zone does not include a fire system rule. This can ensure that the user is made aware of any zones which do not include fire system rules and can allow the user to create rule(s) for the particular zone(s).

A report 1056 can be generated based on the test. For example, the report 1056 can be a report detailing the results of the fire system rules included in the list of tested fire system rules 1054. For example, the report 1056 can be a commissioning report, inspection report, and/or maintenance report, among other types of reports. For example, the report 1056 can include which alarm zones of a particular fire system rule were activated, which fire safety devices activated, which control zones activated, whether there is an error in the fire system rules, whether a fire hardware device is faulty, where such errors or faulty fire safety devices are located, and/or whether any zones do not include fire system rules, etc.

Figure 11:
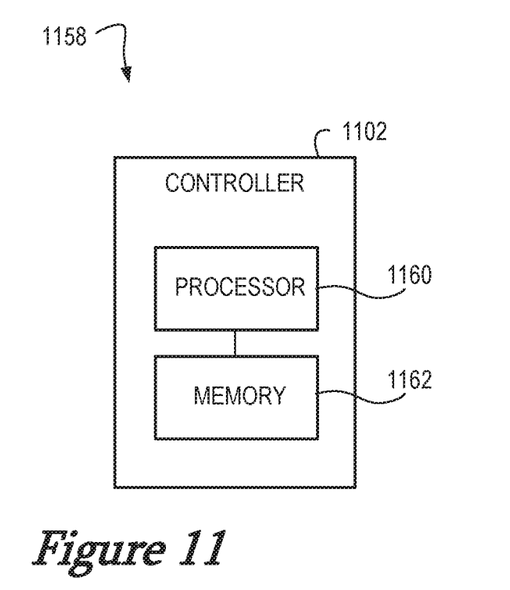
FIG. 11 is an example of a computing device for fire system rule generation, in accordance with one or more embodiments of the present disclosure.

FIG. 11 is an example of a computing device 1102 for fire system rule generation, in accordance with one or more embodiments of the present disclosure. Computing device 1102 can be, for example, controller 214, 314, previously described in connection with FIGS. 2 and 3, respectively.

As illustrated in FIG. 11, computing device 1102 can include a memory 1162 and a processor 1160. The memory 1162 can be any type of storage medium that can be accessed by the processor 1160 to perform various examples of the present disclosure. For example, the memory 1162 can be a non-transitory computer readable medium having computer readable instructions (e.g., computer program instructions) stored thereon that are executable by the processor 1160 for fire system rule generation in accordance with the present disclosure.

The memory 1162 can be volatile or nonvolatile memory. The memory 1162 can also be removable (e.g., portable) memory, or non-removable (e.g., internal) memory. For example, the memory 1162 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 1162 is illustrated as being located within computing device 1102, embodiments of the present disclosure are not so limited. For example, memory 1162 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for fire system rule generation, comprising:
    a memory; and
    a processor configured to execute instructions stored in the memory to:
        receive a partial textual input via a textual rule prompt;
        generate, based on the partial textual input, a number of pre-determined textual rule sub-objects, wherein the number of pre-determined textual rule sub-objects include objects included within a particular rule input condition or rule output condition;
        receive a rule input condition by receiving a selection of a pre-determined textual rule sub-object of the number of pre-determined textual rule sub-objects;
        receive a rule output condition for a fire control system of a facility;
        program a fire system rule for the facility based on the rule input condition and the rule output condition;
        transmit the fire system rule to a fire control panel of the fire control system of the facility; and
        simulate the fire system rule by causing the fire control panel of the fire control system to execute the fire system rule in the facility in response to a simulation input to the computing device; and
    a user interface configured to display an indication of a number of zones in the facility not having programmed fire system rules and a total number of zones in the facility.

2. The computing device of claim 1, wherein the processor is configured to execute the instructions to receive a selection of a fire hardware device included with the rule input condition.

3. The computing device of claim 2, wherein the processor is configured to execute the instructions to receive selection of an action for the fire hardware device with the rule output condition.

4. The computing device of claim 1, wherein the processor is configured to execute the instructions to receive an operator condition to modify at least one of the rule input condition and the rule output condition.

5. The computing device of claim 1, wherein:
    the user interface is configured to display a textual rule prompt; and
    the processor is configured to execute the instructions to receive the rule input condition and the rule output condition via the textual rule prompt.

6. The computing device of claim 1, wherein:
    the user interface is configured to display a graphical rule prompt; and
    the processor is configured to execute the instructions to receive the rule input condition and the rule output condition via the graphical rule prompt.

7. The computing device of claim 1, wherein the processor is configured to execute the instructions to display, in response to an input, which zones of the total number of zones in the facility do not include a programmed fire system rule.

8. The computing device of claim 1, wherein the processor is configured to execute the instructions to generate a report based on the simulation of the fire system rule.

9. The computing device of claim 1, wherein the processor is configured to execute the instructions to generate the number of pre-determined textual rule sub-objects based on the number of pre-determined textual rule sub-objects each having a description that partially matches the partial textual input.

10. A non-transitory computer readable medium having computer readable instructions stored thereon that are executable by a processor to:
    display, via a user interface, a textual rule prompt;
    receive, via the textual rule prompt, a partial textual input;
    generate, based on the partial textual input, a number of pre-determined textual rule sub-objects;
    receive a rule input condition for a fire control system of a facility by receiving a selection of a pre-determined textual rule sub-object of the number of pre-determined textual rule sub-objects;
    receive a selection of a fire hardware device associated with the rule input condition;
    receive a rule output condition for the fire control system of the facility via the textual rule prompt;
    program a fire system rule for the facility based on the rule input condition and the rule output condition;
    transmit the fire system rule to a fire control panel of the fire control system of the facility;
    simulate the fire system rule by causing the fire control panel of the fire control system to execute the fire system rule in the facility in response to a simulation input; and
    display, via the user interface, an indication of a number of zones in the facility not having programmed fire system rules and a total number of zones in the facility.

11. The computer readable medium of claim 10, wherein the instructions are executable by the processor to receive the rule input condition and the rule output condition via a selection of a textual rule object included in the textual rule prompt.

12. The computer readable medium of claim 11, wherein in response to the selection of the textual rule object, the instructions are further executable by the processor to:
    generate a number of pre-determined textual rule sub-objects associated with the textual rule object; and
    receive at least one of the rule input condition and the rule output condition via a selection of a textual rule sub-object included in the number of pre-determined textual rule sub-objects.

13. The computer readable medium of claim 10, wherein the instructions are executable by the processor to receive the rule input condition and the rule output condition via the partial textual input in the textual rule prompt.

14. A method for fire system rule generation, comprising:
    displaying, via a user interface, a textual rule prompt;
    receiving, via the textual rule prompt, a partial textual input;
    generating, by a computing device based on the partial textual input, a number of pre-determined textual rule sub-objects;
    receiving, by the computing device, a rule input condition for a fire control system of a facility via the textual rule prompt by receiving a selection of a pre-determined textual rule sub-object of the number of pre-determined textual rule sub-objects;

receiving, by the computing device, a selection of a fire hardware device associated with the rule input condition;

receiving, by the computing device, a rule output condition for the fire control system of the facility via the textual rule prompt;

programming, by the computing device, a fire system rule for the facility based on the rule input condition and the rule output condition;

transmitting, by the computing device, the fire system rule to the fire control panel of a fire control system of the facility;

simulating, by the computing device, the fire system rule by causing the fire control system to execute the fire system rule in the facility in response to a simulation input to the computing device; and displaying, via the user interface, an indication of a number of zones in the facility not having programmed fire system rules and a total number of zones in the facility.

15. The method of claim 14, wherein the method includes displaying, via the user interface, details about the fire system rule.

16. The method of claim 14, wherein the method includes receiving the rule output condition by receiving another selection of another pre-determined textual rule sub-object of the number of pre-determined textual rule sub-objects.

* * * * *